(12) United States Patent
Saiz et al.

(10) Patent No.: US 8,245,464 B2
(45) Date of Patent: Aug. 21, 2012

(54) FLEXIBLE DUAL SKIN WALL AND DEVICE FOR TENSIONING A DUAL SKIN FLEXIBLE WALL

(75) Inventors: Carlos Saiz, Challes les Eaux (FR); Sebastien Baril, Bassens (FR)

(73) Assignee: Tissage Et Enduction Serge Ferrari SA, Saint Jean de Soudain (FR)

(*) Notice: Subject to any disclaimer, the term of this patent is extended or adjusted under 35 U.S.C. 154(b) by 200 days.

(21) Appl. No.: 12/671,301

(22) PCT Filed: Jul. 31, 2008

(86) PCT No.: PCT/FR2008/051446
§ 371 (c)(1),
(2), (4) Date: Jan. 29, 2010

(87) PCT Pub. No.: WO2009/022075
PCT Pub. Date: Feb. 19, 2009

(65) Prior Publication Data
US 2010/0200037 A1    Aug. 12, 2010

(30) Foreign Application Priority Data
Aug. 1, 2007  (FR) ..................... 07 05623

(51) Int. Cl.
*E04G 5/12* (2006.01)
*E04B 7/14* (2006.01)
(52) U.S. Cl. ............... 52/222; 52/73; 52/75; 52/2.22; 52/2.25; 135/907
(58) Field of Classification Search .......... 52/222, 52/73–75, 78, 2.22, 2.24, 2.25, 2.19; 135/115, 135/121, 119, 117, 124, 907
See application file for complete search history.

(56) References Cited

U.S. PATENT DOCUMENTS

| | | | | | |
|---|---|---|---|---|---|
| 2,797,696 | A | * | 7/1957 | Fritsche | 135/136 |
| 2,828,756 | A | * | 4/1958 | Worley | 135/97 |
| 2,986,150 | A | * | 5/1961 | Torian | 52/63 |
| 3,024,796 | A | * | 3/1962 | Bird | 52/2.14 |
| 3,059,655 | A | * | 10/1962 | Bird | 52/2.14 |
| 3,332,177 | A | * | 7/1967 | Sepp | 52/2.19 |

(Continued)

FOREIGN PATENT DOCUMENTS
DE    3320212 A1    3/1984
(Continued)

OTHER PUBLICATIONS

European Patent Office, International Search Report, dated Mar. 5, 2009, (3 pgs. in French Language and 3 pgs in English Language).

*Primary Examiner* — Phi Dieu Tran A

(57) ABSTRACT

A device for tensioning a dual-skin flexible wall capable of interaction with at least one rigid mount, the device being mounted at the opposite edges of two skins to be retained by the rigid mount. The device includes a cord designed to interact with a groove formed in the rigid mount, and an inflatable bead capable of spacing the two skins away from and parallel to each other. Once inflated, the inflatable bead has a substantially cylindrical shape and remains confined outside the volume occupied by the rigid mount.

7 Claims, 3 Drawing Sheets

U.S. PATENT DOCUMENTS

| | | | | |
|---|---|---|---|---|
| 3,353,309 A * | 11/1967 | Kwake | | 52/2.14 |
| 3,387,412 A * | 6/1968 | Kwake | | 52/2.14 |
| 3,432,609 A * | 3/1969 | Brion, Jr et al. | | 174/363 |
| 3,462,521 A * | 8/1969 | Dante | | 264/32 |
| 3,503,101 A * | 3/1970 | Arpad | | 24/443 |
| 3,619,957 A * | 11/1971 | Adam | | 52/2.21 |
| 3,661,693 A * | 5/1972 | Pierson | | 428/123 |
| 3,664,069 A | 5/1972 | Ikai et al. | | |
| 3,706,206 A * | 12/1972 | Clark | | 405/185 |
| 3,744,191 A * | 7/1973 | Bird | | 52/2.23 |
| 3,838,726 A * | 10/1974 | Vredevoogd | | 160/188 |
| 3,857,209 A * | 12/1974 | Milliken | | 52/2.17 |
| 3,924,363 A * | 12/1975 | Candle | | 52/2.19 |
| 3,975,915 A * | 8/1976 | Haw | | 405/110 |
| 4,041,653 A * | 8/1977 | Rain | | 52/2.19 |
| 4,181,986 A * | 1/1980 | Aine | | 4/499 |
| 4,192,105 A * | 3/1980 | Morgan | | 52/2.25 |
| 4,229,914 A * | 10/1980 | Lucas | | 135/124 |
| 4,567,696 A * | 2/1986 | Malet | | 52/2.25 |
| 4,665,670 A * | 5/1987 | van den Burg | | 52/222 |
| 4,694,543 A * | 9/1987 | Conley | | 24/461 |
| 4,726,153 A * | 2/1988 | Adler et al. | | 52/63 |
| 4,769,877 A * | 9/1988 | Conley | | 24/462 |
| 5,029,422 A * | 7/1991 | Scherrer | | 52/222 |
| 5,148,640 A * | 9/1992 | Reilly, Sr. | | 52/74 |
| 5,209,029 A * | 5/1993 | Foerst | | 52/63 |
| 5,333,425 A * | 8/1994 | Nickerson et al. | | 52/222 |
| 5,564,234 A * | 10/1996 | Vermeulen | | 52/63 |
| 5,699,820 A * | 12/1997 | Evans et al. | | 135/96 |
| 6,192,633 B1 * | 2/2001 | Hilbert | | 52/2.18 |
| 6,260,306 B1 * | 7/2001 | Swetish et al. | | 52/2.18 |
| 6,325,085 B1 * | 12/2001 | Gower | | 135/90 |
| 6,332,290 B1 * | 12/2001 | Delamare | | 52/2.22 |
| 6,338,226 B1 * | 1/2002 | Gauthier et al. | | 52/63 |
| 6,571,815 B1 * | 6/2003 | Hill | | 135/96 |
| 6,708,451 B1 * | 3/2004 | Gomes | | 52/2.17 |
| 7,231,953 B2 * | 6/2007 | Varley et al. | | 160/273.1 |
| 7,415,799 B2 * | 8/2008 | Morris | | 52/2.11 |
| 7,434,356 B2 * | 10/2008 | Morris | | 52/2.11 |
| 7,434,357 B2 * | 10/2008 | Morris | | 52/2.22 |
| 7,562,493 B2 * | 7/2009 | Kassianoff | | 52/2.25 |
| 7,871,052 B2 * | 1/2011 | Baum | | 248/505 |
| 7,987,863 B2 * | 8/2011 | Warner | | 135/97 |
| 2004/0074157 A1 * | 4/2004 | Chazal | | 52/66 |

FOREIGN PATENT DOCUMENTS

| | | |
|---|---|---|
| DE | 9017542 U1 | 5/1991 |
| EP | 306717 A1 | 3/1989 |
| EP | 1439272 A1 | 7/2004 |
| WO | WO-03054329 A1 | 7/2003 |

* cited by examiner

FLEXIBLE DUAL SKIN WALL AND DEVICE FOR TENSIONING A DUAL SKIN FLEXIBLE WALL

CROSS REFERENCED TO RELATED APPLICATIONS

This application is a National Stage filing under 35. U.S.C. §371 of PCT Application No. PCT/FR2008/051446, filed on Jul. 31, 2008. This application also claims the benefit of French Application No. 0705623 filed on Aug. 1, 2007. The entirety of each application is incorporated herein by reference.

FIELD OF THE INVENTION

The invention relates to the field of shelters erected from rigid, usually metallic, mounts and fabric dual-skin walls extending between two parallel rigid mounts. These dual-skin walls, designed to form shelters, may notably take the form of coverings serving as a roof, of walls, of internal partitions or of ceilings.

The invention concerns more particularly the device for tensioning such a dual-skin flexible wall with the metallic structure formed by the various rigid mounts. The invention also concerns the flexible wall equipped with such a tensioning device.

BACKGROUND OF THE INVENTION

The use of compressed air to inflate the interstice between the two skins of a flexible wall of this type so as to tension the two fabric skins and thus eliminate the folds present on its surface and create a generally smooth appearance on the outside is generally known. Such a device has notably been described in document EP 0 306 717 in which a dual-skin flexible wall has a cord designed to be inserted into a groove in the rigid mount.

In this case, however, once the wall is inflated, the wall section is lens-shaped, each skin of the flexible wall bulging outwards. When these walls are used as tent roofs and subjected to heavy rain, this form of wall can then generate, at each join between two flexible walls, a large rainwater-retention area. Such water-retention areas are particularly inconvenient because they cause water stains, they enable the formation of green algae and are the cause of serious leaks that may occur in the field of industrial tent roofs.

Moreover, such walls require considerable compressed-air energy since the inflated air volume is very large in order to tension the fabrics that form the skins.

Furthermore, the damage of one of the skins of the flexible roof automatically causes the deflation and ruin of the flexible wall. Moreover, it is impossible to use skins made of an open-weave fabric because each of the skins must be impermeable to air.

Furthermore, these lenticular double skins have a very poor insulation capacity in summer and in winter due to the fact that the thickness of the lens thus formed between the two tensioned skins is in the order of 1 meter, a thickness that results in the internal air convection flows being enormous and responsible for large thermal exchanges and therefore for the loss of insulation.

Devices have also been designed such as those described in document DE 33 20 212 in which a cord is placed in an inflatable sleeve then inserted in a groove made in a rigid mount.

However, once the sleeve is inflated, this type of device no longer allows the dual-skin wall to be moved in translation in relation to the rigid mount. In fact, the sleeve deforms and then exerts pressure in the mount groove and immobilises—by virtue of the friction thus generated—the sleeve in relation to the rigid mount. Such inflated sleeve does not, therefore, have a cylindrical form.

Similarly, document DE 90 17 542 describes a device in which a strip is introduced into a groove to immobilise the edges of a dual-skin wall. Such a device has no cord connected with the edges of the two skins and does not allow the wall to be removed once the bead has been inflated. Lastly, with this device it is not possible to achieve an effective tensioning of the wall since, on inflating the bead, the latter may cause the groove strip to dislodge.

The aim of the invention is therefore to create a dual-skin flexible wall with a low inflation volume, designed to tension the two skins, as well as a small air-space separating the two skins.

Another aim of the invention is to prevent the formation of water-retention areas, particularly on the roof of a shelter created using a plurality of flexible walls placed parallel to each other.

Moreover, another aim is also to enable the use of skins made of an open-weave fabric both to create roofs having built-in solar protection, and walls whose inner skin is open-woven to enable the capture and absorption of sound, and lastly to melt snow on the roof and facilitate its drainage in the form of liquid onto a flat surface without pockets.

Lastly, another aim is also to enable movement in translation of the dual-skin wall in relation to a rigid mount when the bead is inflated.

DESCRIPTION OF THE INVENTION

The invention concerns a device for tensioning a dual-skin flexible wall capable of interaction with at least one rigid mount and being mounted at the opposite edges of two skins to be retained by the rigid mount. Such device comprising:

a cord designed to interact with a groove formed in the rigid mount;

an inflatable bead capable of spacing the two skins away from and parallel to each other.

According to the invention, the tensioning device is characterised in that, once inflated, the inflatable bead has a substantially cylindrical shape and remains confined outside the volume occupied by the rigid mount.

In other words, such a tensioning device is arranged at each joint of the flexible wall with a rigid mount and allows the flexible wall to connect with the rigid mount, and at the same time enables the two skins to be tensioned in a flat and symmetrical manner so as to eliminate the folds on their surfaces.

The position of the inflatable bead close to the wall's area of connection with the rigid mount enables the two skins to be placed in parallel over a large surface between the two rigid mounts. Only a small portion of each skin at the edges is not flat, but faces the rigid mount and is therefore not noticeable.

Moreover, the inflatable bead does not exert pressure in the rigid mount groove. Thus, this device does not cause friction on the rigid mount and it is possible to move the flexible wall, even when tensioned, in translation in relation to the rigid mount.

Such a tensioning device can be created in various ways, and notably it can be incorporated between the two skins and require their presence in order to be formed. It can also be created independently then inserted between the two skins by means of a connection procedure.

Thus, according to a first embodiment, the device can be formed by an internal hem connecting the two skins, the two skins being formed by a single sheet of fabric folded over itself and forming such internal hem at one edge of the wall on which a boltrope incorporating the cord is inserted, the internal hem receiving the inflatable bead.

In other words, the dual-skin flexible wall and the tensioning device are created by folding over a sheet of fabric on itself and incorporating an inflatable bead in an internal hem enclosed by means of a boltrope incorporating the cord. Only the internal hem is inflated by means of the bead and only the bead needs to be made of a gas-tight material.

According to a second embodiment, the device may be formed by a first band folded over itself and forming an internal pocket, the internal pocket being positioned at one of the edges of the wall on which a boltrope incorporating the cord is inserted, the internal pocket receiving the inflatable bead.

In this case, the two skins may be directly or indirectly connected with the internal pocket or with the boltrope. Moreover, each of the skins may be made of different materials, which can be particularly advantageous when one of the skins is made of a very expensive technical material. It is therefore not necessary to use the material used for the skins to form, on the one hand, the first band and, on the other hand, the two coupling bands inserted on the band folded over on itself.

Similarly, the boltrope may itself be welded to the band folded over on itself in a flat or curved portion of the band once inflated by the bead.

Advantageously, the device may have a quick-coupling device positioned between the cord and the edge of the wall receiving the inflatable bead.

In other words, the quick-coupling device allows the cord and the double-skin wall incorporating the inflatable bead to be manufactured and transported separately. The wall can then be rolled up which allows its size to be reduced and reduces the associated transport and logistics costs.

Such a coupling device can notably take the form of a fastener of the type commonly designed by Éclair-Prestyl®. In this case, the two bands designed to interact with each other and forming the fastener are thermowelded with, on one side, a portion of fabric connected to the cord and, on the other side, a portion of fabric connected to the inflatable bead.

Moreover the portion of fabric connected to the cord can be replaced if badly worn or if a new version that offers better performance in terms of friction coefficient or wear resistance is subsequently developed and is suitable for the device of the invention.

As stated above, the invention also concerns a dual-skin flexible wall comprising a tensioning device as previously described.

In other words, such a flexible wall comprises a device enabling at the same time the two skins to be retained on rigid mounts and also to tension these two skins parallel to each other.

In practice, such a flexible wall may comprise a device comprising a band folded over on itself or a cylindrical sleeve, the two skins being thermowelded to the device.

In other words, such a flexible wall may be formed by two skins of different kinds and a tensioning device comprising a band folded over on itself or a sleeve whose external surface may be thermowelded to the two skins.

Advantageously, one of the two skins of the flexible wall may be an open-weave sheet of fabric. In this case, it is possible to renew the air contained inside the two skins in particular so as to prevent it from overheating. Such a flexible wall may also enable snow on the external open-weave fabric to be retained which has the immediate result of causing excellent heat insulation, the snow not being in contact with the internal fabric skin.

Secondly, circulating hot air between the two skins causes the internal layer of snow to melt quite quickly. This warm air can be injected by an ad hoc device, or more simply consist of the internal warm air which has to be renewed. Lastly, on melting, the water runs onto the second skin formed by a watertight membrane over which the water can run off.

A third skin can also be used to form two separate volumes inside the wall in which air flows can circulate. Such an arrangement would therefore enable the insulation of a shelter formed by such walls to be improved and also allow fresh outside air to be taken in and heated by the internal warm air before entering the shelter.

This third skin can in particular take the form of a film that can stretch without deforming the two inflatable beads equipping a wall.

Moreover, so as to make it easier for the boltrope to slide inside the section and also guarantee a good seal of the boltrope/section joint, wires can be arranged on the surface of the boltrope and placed parallel to the cord.

BRIEF DESCRIPTION OF THE FIGURES

The manner of embodying the invention as well as the advantages deriving therefrom will emerge more clearly from the description and the following embodiment, given by way of a non-limiting example, with reference to the figures in which.

MANNER OF EMBODYING THE INVENTION

As stated above, the invention concerns a flexible wall and its tensioning device enabling such flexible wall to be assembled with at least one rigid mount.

Figure 1:
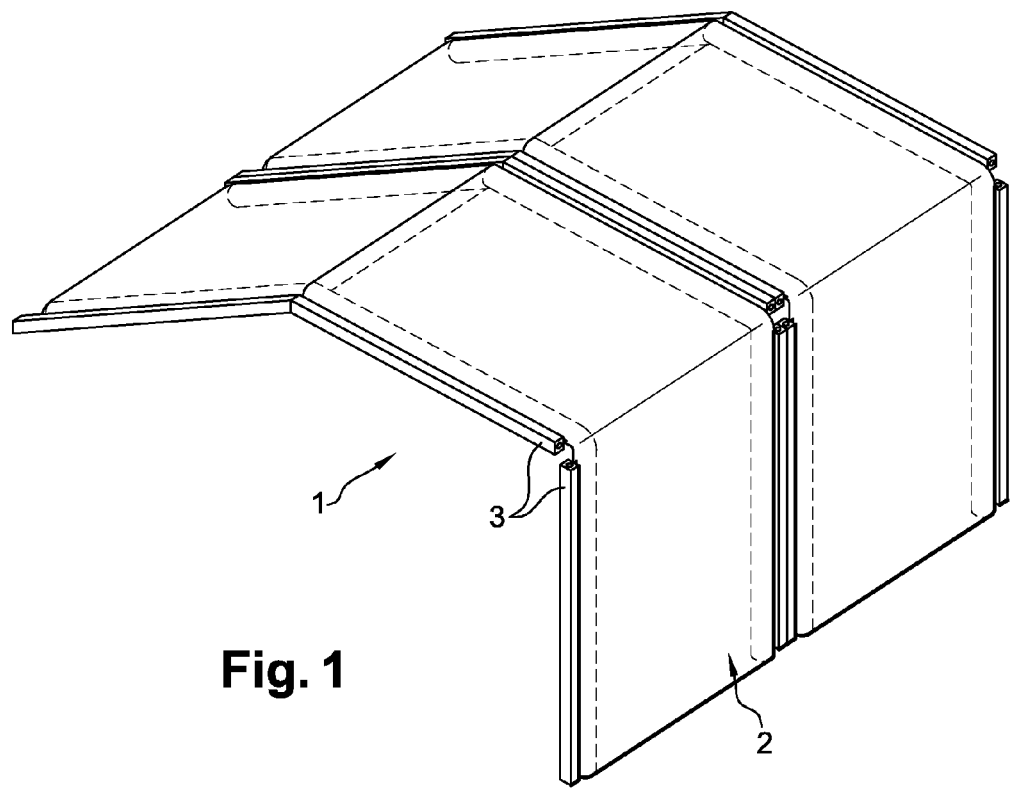
FIGS. 1 and 2 are perspective views of the two examples of shelters that can be created by means of the flexible walls according to the invention.

As shown in FIG. 1, a juxtaposition of flexible walls 2 can enable a shelter 1 to be created and in particular form at the same time a vertical wall and an inclined wall so as to form a partition and a roof in one piece. In this way, the seal at the joint between the roof and the vertical partitions can be guaranteed.

Figure 2:
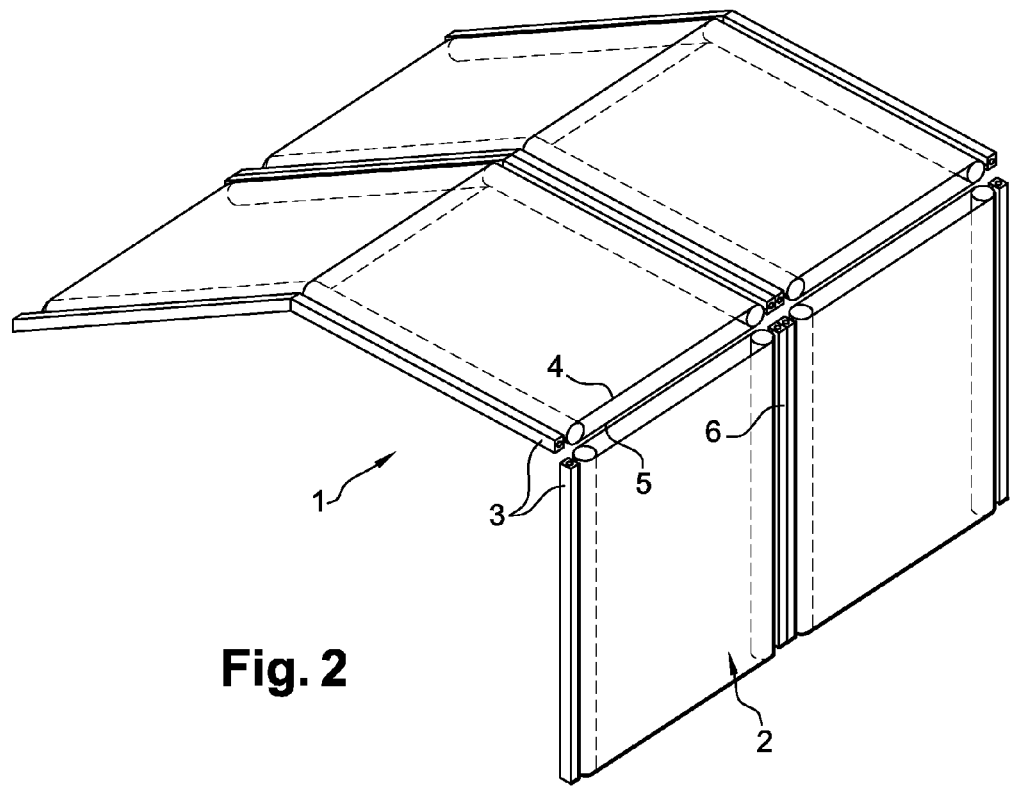

As shown in FIG. 2, an assembly of two flexible walls enables, on the one hand, the vertical walls and, on the other, the inclined walls of the roof to be created.

In this case, a flap, not shown, enables a seal to be formed at the joint between these two skins. Such a flexible wall 2 comprises two skins 4, 5 retained in parallel between two rigid mounts 3, 6.

Figure 3:
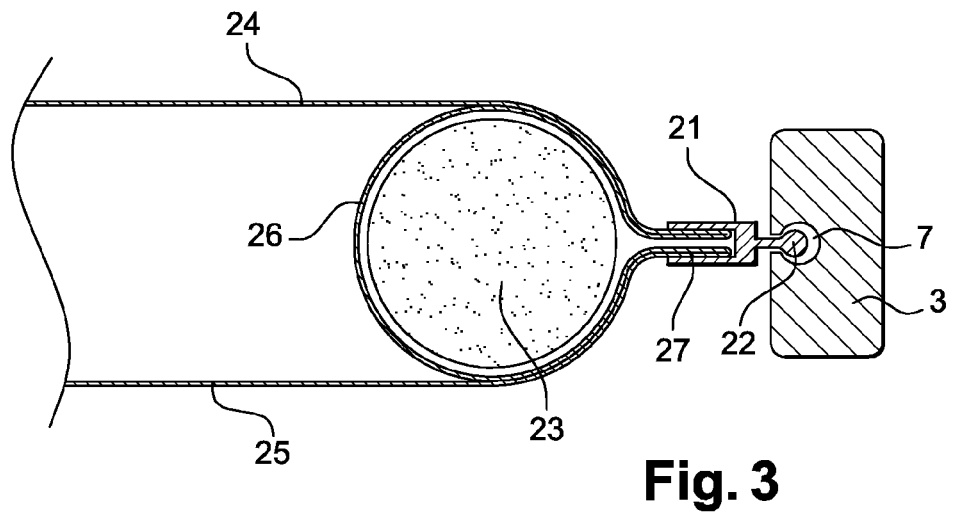
FIGS. 3, 4 and 5 show cross-sections of three variations of a tensioning device according to the invention.

As shown in FIG. 3, and according to a first variation, such a tensioning device comprises a cylindrical inflatable bead 23 placed inside an internal hem 26 connecting the two skins 24, 25 formed by a sheet of fabric folded over on itself. Moreover, the tensioning device also comprises a boltrope 21 inserted in the fold area 27 of the sheet of fabric. This boltrope 21 thus incorporates a cord 22 which may be inserted in a groove 7 of the mount 3.

A valve, not shown, is fitted to one of the ends of the inflatable bead 23 and enables the inflation of the bead which consists of a cylindrical sealed membrane. The boltrope 21 can be connected in various ways to the sheet of fabric, in particular by a thermowelding process.

Figure 4:
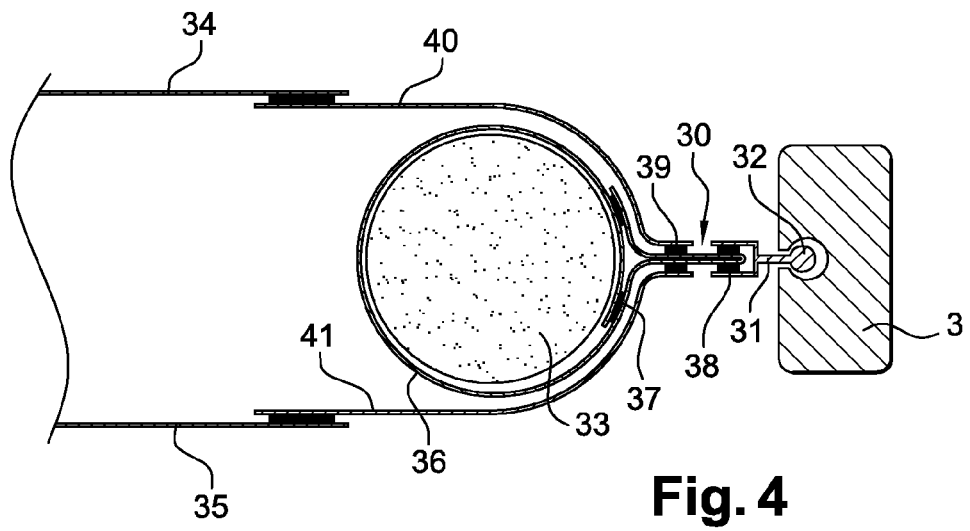

As shown in FIG. 4, and according to a second embodiment of the invention, the dual-skin flexible wall may comprise a fabric band 36 folded back on itself in the overlap area 37 and forming an internal pocket between two anchoring bands 40, 41. The internal and external faces of the band 36 are connected by gluing or thermowelding to the overlap area 37.

On inflating the bead 33, this arrangement enables the overlap area 37 to be subjected to shear stress which imparts considerable tear resistance to the band 36 folded back on itself. The two skins 34, 35 are then placed on the anchoring bands 40, 41 and connected by gluing or thermowelding.

The band 36 enables a limited expansion volume to be defined for the inflatable bead 33 and thus the two skins 34, 35 are tensioned, while being positioned parallel to each other. In this variation, a boltrope 31 is also positioned in an extreme area 38 of a fold 30 of the band 36 folded back on itself.

Moreover, the anchoring bands 40, 41 are also connected to a second area 39 of the fold 30 of the band 36. This arrangement enables the number of thicknesses of sheets of fabric to be limited to four and enables the device to remain relatively flexible. It is also possible to use, with such a device, skins 34, 35 of different kinds and in particular to use skins made of an open-weave fabric material.

Figure 5:
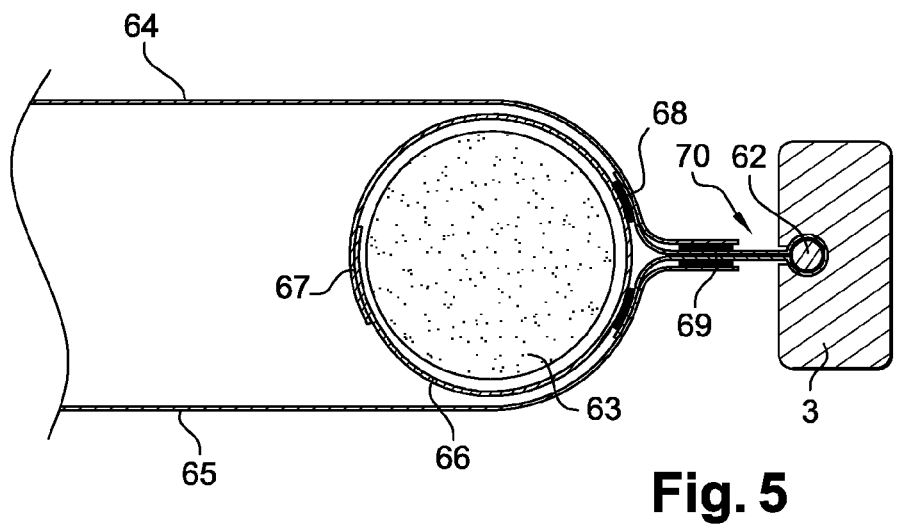

As shown in FIG. 5, a third variation of the invention may be embodied by folding a band 66 only at its edges so as to form an overlap area 67 away from the anchoring area of the boltrope 70. In this case, the boltrope 70 may be directly inserted by welding onto the band 66 in an area 68 facing the rigid mount 3. Said boltrope 70 is formed of a cord 62 surrounded by a fabric band. The two skins 64, 65 are then welded onto a flat portion 69 of the boltrope 70.

Figure 6:
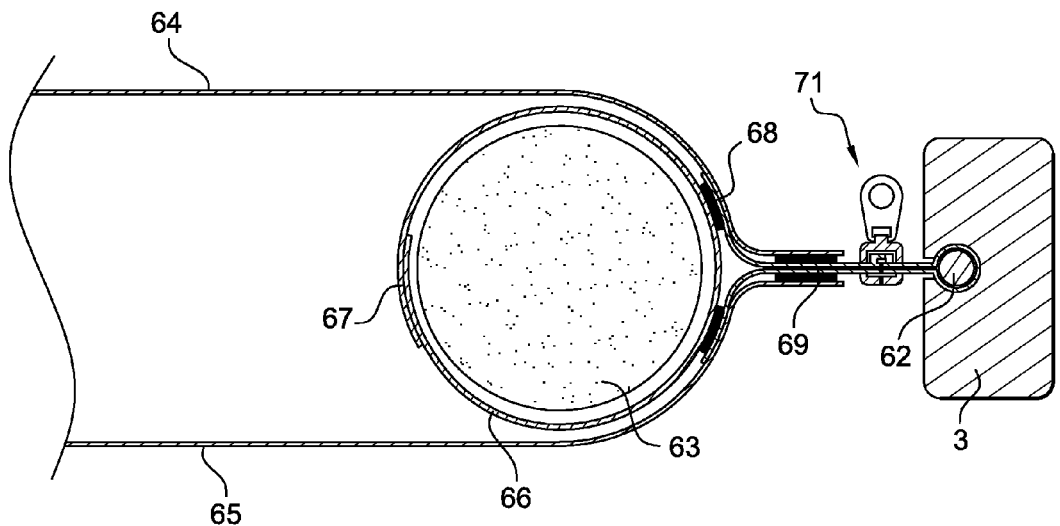
FIG. 6 shows a cross-section of a device having a quick-coupling device.

As shown in FIG. 6, said boltrope may also comprise a quick-coupling device 71 enabling, on the one hand, separate manufacture and transportation of the two elements which are the cord and the double-skin wall and, on the other hand, replacement of the cord independently from the wall. In the variation shown, this device is represented in the form of a zip fastener.

It emerges from the above that a tensioning device and a flexible wall according to the invention offer numerous advantages, in particular:
they enable the volume that must be inflated in order to tension such dual-skin flexible walls to be reduced;
they enable the transport and logistics costs of such a wall to be reduced;
they enable replacement of the cord alone;
they enable skins of different kinds to be used in order to adapt the shelter to the environmental conditions in which it is to be used;
they enable gas-permeable materials to be used in order to form at least one of the skins;
they enable the number of manufacturing operations of such flexible walls to be limited; and
they can enable a particularly efficient and watertight shelter to be created, even in the event of snow or when the snow melts on one of the skins.

The invention claimed is:

1. A device for tensioning a dual-skin flexible wall capable of interaction with at least one rigid mount, the device being mounted at the opposite edges of two skins to be retained by the rigid mount and comprising:
a cord designed to interact with a groove formed in the rigid mount;
an inflatable bead, once inflated, having a substantially cylindrical shape spacing the two skins away from and parallel to each other and remaining confined outside the volume occupied by the rigid mount.

2. The device according to claim 1, wherein the device is formed by an internal hem connecting the two skins, the two skins being formed by a single sheet of fabric folded over itself and forming the internal hem at one edge of the wall on which a boltrope incorporating the cord is inserted, the internal hem receiving the inflatable bead.

3. The device according to claim 1, wherein the device is formed by a first band folded over itself and forming an internal pocket, the internal pocket being positioned at one of the edges of the wall on which a boltrope incorporating the cord is inserted, the internal pocket receiving the inflatable bead.

4. The device according to claim 1, further comprising a quick-coupling device positioned between the cord and the edge of the wall receiving the inflatable bead.

5. A dual-skin flexible wall comprising a tensioning device according to claim 1.

6. A dual-skin flexible wall comprising a tensioning device according to claim 3, wherein the two skins are thermowelded to the device.

7. The dual-skin flexible wall according to claim 5, wherein one of the two skins is an open-weave textile sheet.

* * * * *